Aug. 12, 1952

G. VALENSI 2,606,962

COLOR TELEVISION RECEIVER

Filed July 18, 1951

2 SHEETS—SHEET 1

INVENTOR
Georges Valensi
BY Brown & Seward
ATTORNEYS

Aug. 12, 1952 G. VALENSI 2,606,962

COLOR TELEVISION RECEIVER

Filed July 18, 1951 2 SHEETS—SHEET 2

INVENTOR
Georges Valensi
BY Brown & Seward
ATTORNEYS

Patented Aug. 12, 1952

2,606,962

UNITED STATES PATENT OFFICE 2,606,962

COLOR TELEVISION RECEIVER

Georges Valensi, Paris, France

Application July 18, 1951, Serial No. 237,369
In France July 25, 1950

2 Claims. (Cl. 178—5.4)

The present invention relates to color television systems of the kind in which every elemental area of the picture to be transmitted is characterized by its brightness and by its color and these characteristics are transmitted respectively by means of a brightness signal and a coded color signal, as described in my U. S. Patent No. 2,492,926, issued December 27, 1949, for "Color Television System."

The object of my invention is to provide a receiver of the kind disclosed in this patent which is simpler and more efficient than those known up to now.

Figure 1:
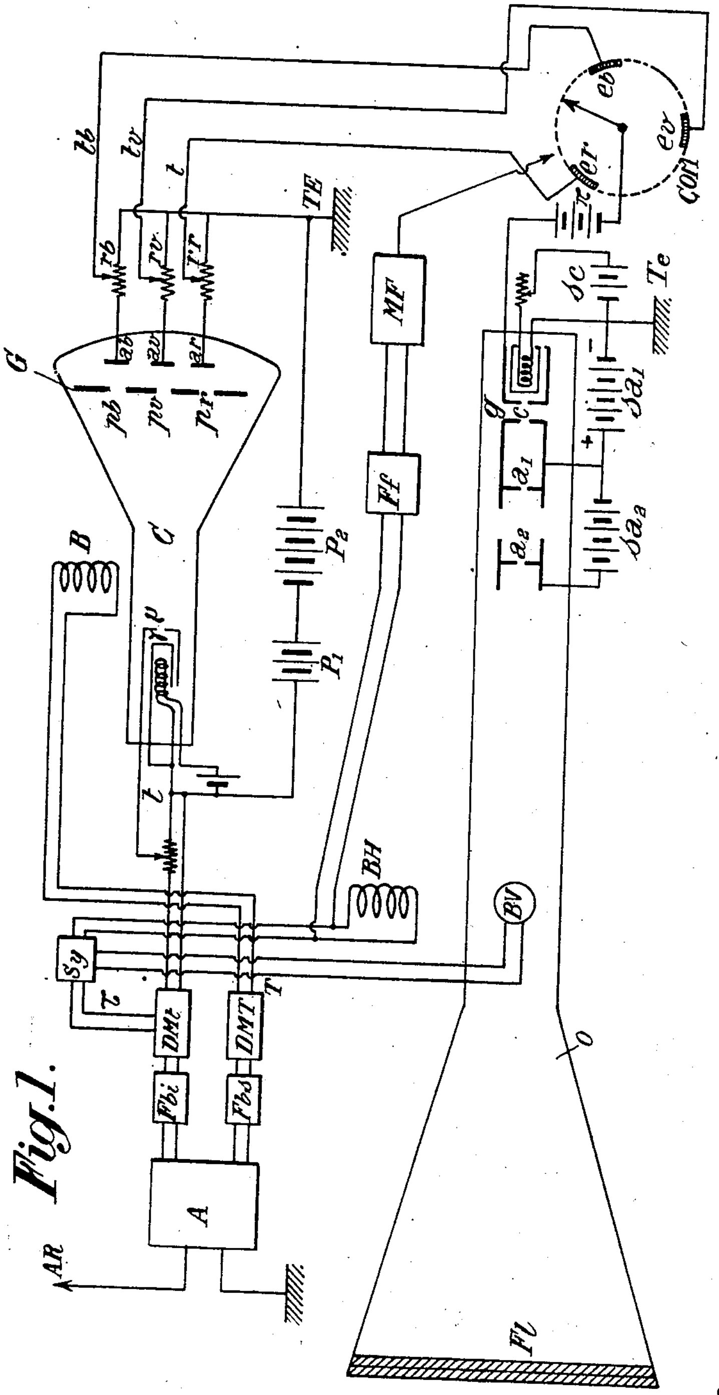
Figure 1A:
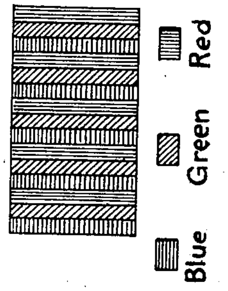
Figures 2, 2A, 3, 4:
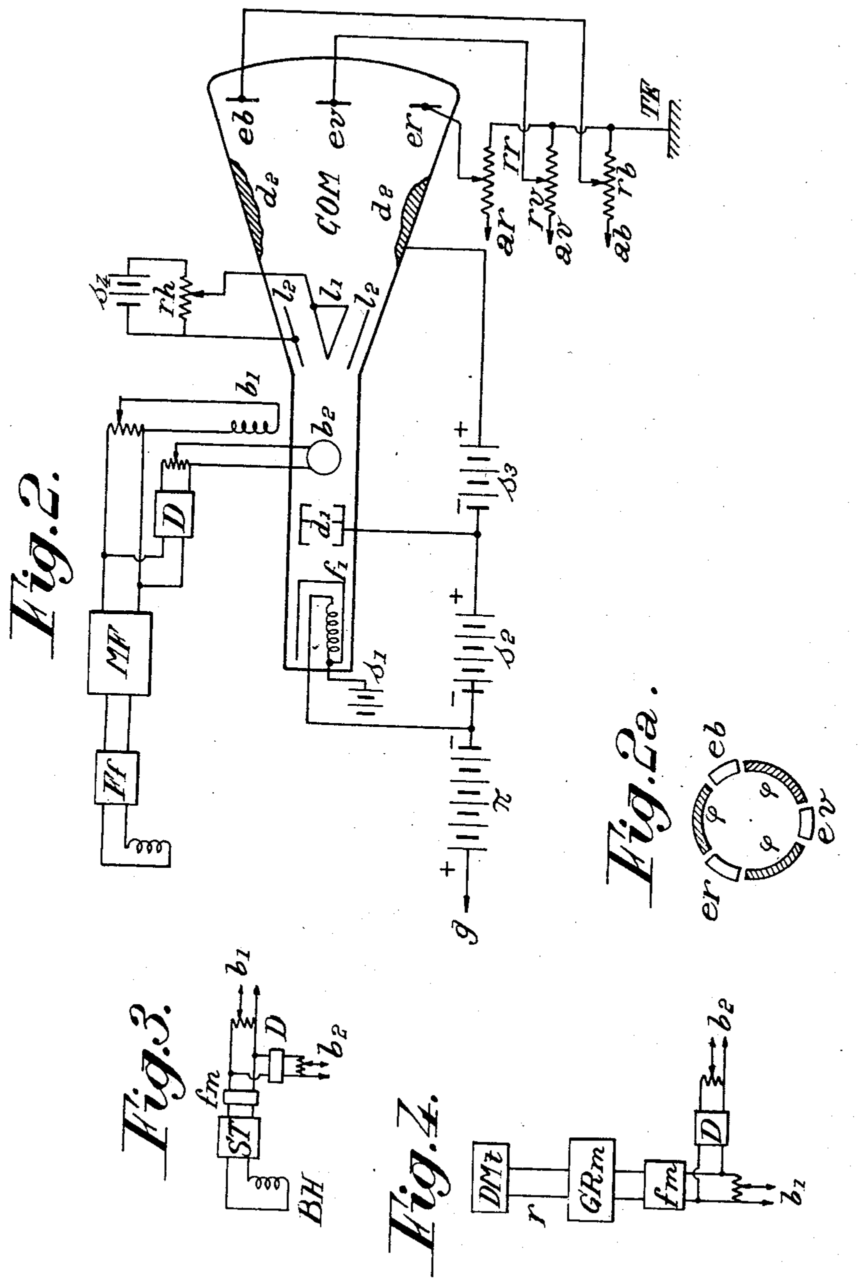

Preferred embodiments of my invention will be hereinafter described with reference to the accompanying drawings, given merely by way of example, and in which:

Fig. 1 shows the lay-out of a color television receiver according to my invention;

Fig. 1*a* shows on an enlarged scale a portion of the viewing screen of this receiver;

Fig. 2 is a diagrammatic view of a cathode ray switch incorporated in said receiver;

Fig. 2*a* is a corresponding detail view;

Figs. 3 and 4 are part views relating to modifications.

In the receiver shown by Fig. 24 of my U. S. Patent No. 2,492,926, above referred to, the viewing screen of cathode ray tube O carries a three-color network of lines. This tube includes three electron guns, each comprising a cathode *cb, cv, cr*, a Wehnelt cylinder *gb, gv, gr*, and focusing electrodes $a_1b$—$a_2b$; $a_1v$—$a_2v$, $a_1r$—$a_2r$. Deflecting plates *Pb, Pr* serve to juxtapose on the screen *Fl* of tube O the spots formed thereon by the electron beams from the three cathodes so that the three spots simultaneously scan the blue, green and red rays of the three-color network of said screen along each scanning line. This juxtaposition, which calls for a perfect linearity of the relaxation oscillations which control the scanning of screen *Fl* under the action of the magnetic fields of coils *bh* and *bv* and also for a highly accurate adjustment of the electronic optical system of tube O constitutes a delicate problem. The object of the present invention is to eliminate this problem, and also to simplify the construction of said tube.

In the construction shown by way of example by Fig. 1, AR is the antenna which receives from the transmitter the television signals which, after being amplified in amplifier A and passing through band-pass filters *Fbi* and *Fbs* and demodulators DMT and D*mt*, give rise to the respective brightness signal *t* and coded color signal T which characterize every elemental area of the picture and also to a synchronizing pulse $\tau$ (at the frequency of the picture scanning lines). This pulse $\tau$ serves to synchronize the relaxation oscillation generator *Sy*.

The decoding cathode ray tube is shown at C. The brightness signal *t* is applied to the modulating electrode $\mu$ (Wehnelt cylinder) which controls the intensity of the cathode ray beam issuing from the linear cathode $\gamma$ of tube C supplied from electric energy sources $P_1$, $P_2$. The coded color signal T acts upon the magnetic coil B provided for deflecting this beam, whereby, at any time, the image formed by the electron beam issuing from cathode $\gamma$ is located on a given vertical line of anode G, which is provided with three slots of predetermined respective outlines *pb, pv, pr*. On the corresponding anodes *av, ab, ar* are collected the respective electron fluxes passing through these slots and which correspond to the proportions in which the three basic colors (blue, green and red) are to be mixed for obtaining the color which, in the code that is used, corresponds to the coded signal T. Corresponding alternating voltages *tb, tv, tr* are produced between the earth TE on the one hand, the sliding elements of three rheostats *rb, rv, rr* (connected respectively with anodes *ab, av, ar*) on the other hand.

O is a cathode ray tube including the viewing screen. It includes a cathode *c* delivering electrons under the effect of the heating produced by a source of electrical energy *sc*. The cathode ray beam from this cathode is controlled by a Wehnelt cylinder *g* and electron focussing electrodes are shown at $a_1$ and $a_2$, these electrodes being connected with electric sources $sa_1$ and $sa_2$.

Under the action of the magnetic fields produced by horizontal deflecting coil BH and vertical deflecting coil BV, through which flow the relaxation oscillations supplied by generator *Sy*, the electronic image of cathode *c* (i. e. the spot formed by the electron beam issuing from this cathode) scans the fluorescent screen *Fl* of tube O. This fluorescent screen is diagrammatically shown on Fig. 1*a*. It includes a three-color network formed by very thin vertical bands or lines every third one is blue, the next one green and the next one red and so on. This result may be obtained by constituting these respective bands by matters which give blue, green and red luminescences when struck by the electrons of the beams. Or I may superimpose on a white fluorescent screen a three-color network obtained through photographic or printing methods. Or again, the wall of tube O which carries the white luminescent substance may be arranged to produce selective light effects (light interferences, selective absorption, etc.) along very thin vertical bands respectively.

The spot of the light beam issuing from cathode *c* being of a width equal to that of each of the vertical bands of the three color network formed on screen *fl*, I provide a cathode ray switch COM which controls the intensity of the cathode beam issuing from cathode *c* proportionally to the values of voltages *tb, tv, tr* as said spot is passing on the corresponding blue, green and red bands respectively of screen *Fl*. In other words, while the spot formed by the beam from cathode *c* is travelling successively along the three blue, green and red rays corresponding to the elemental area of the picture that is being scanned, this spot undergoes variations in intensity due to the fact that the control electrode *g* which cooperates with this cathode is connected successively (and correspondingly) with the anodes *ab, av, ar* of decoding tube C.

I may use for this purpose any known cathode ray switch. In the example shown by Fig. 2, this switch is constituted by a cathode ray tube in which the electron beam rotates to describe a cone on the circle of base of which are provided three metal electrodes *eb, ev, er* (Fig. 2*a*). The punctiform cathode *f* of this tube COM emits an electron beam subjected to the action of a focusing anode $d_1$, connected to electric source $s_2$, and a metallic deposit $d_2$ formed on the wall of tube COM acts as a second anode connected to electric source $s_3$. $l_1$ and $l_2$ are auxiliary frustoconical electrodes which serve to locate (through electric deflection) the cathode ray beam exactly upon the generatrices of the one above referred to by adjustment of rheostat *rh* connected with the auxiliary electric source $s_4$. Circular sectors $\varphi$, covered with a fluorescent substance and electrically insulated from electrodes *eb, ev, er* (Fig. 2*a*), facilitate this adjustment by making the path of the spot visible on the base of the cone in question.

Magnetic coils $b_1$, $b_2$ create the rotary field which causes the cathode ray beam to describe this cone.

This rotary field may be obtained through any of a plurality of known methods, examples of which are given by Figs. 2, 3 and 4.

In the first case (Figs. 1 and 2), the fundamental component (or any other sinusoidal component) is extracted from the relaxation oscillation flowing through the horizontal deflecting coil BH of viewing tube O owing to a highly selective electric filter F*f* (having a very narrow pass band). Then, by means of a frequency multiplier MF of a known type, I transform the sinusoidal component into a sinusoidal wave of a frequency equal to the number of elemental areas of the picture scanned per unit of time. This high frequency oscillation is applied on the one hand in phase to coil $b_1$ and on the other hand, through dephasing device D, in quadrature to coil $b_2$. I thus obtain the desired rotary field which, during the time the cathode ray spot of tube O travels across one elemental area of the picture (i. e. across three successive bands of the three color network of screen *Fl*), connects, through the cathode ray beam of switch tube COM, the control electrode *g* of tube O successively with electrodes *eb, ev, er*. Owing to the provision of counter-battery $\pi$, which is arranged in opposition to the direct voltage of sources $s_2$ and $s_3$ in series, the potential, with reference to the cathode *c*, connected to earth TE, of tube O, of the control electrode of this tube O successively assumes the values determined by the electronic fluxes which, for the picture elemental area which is being scanned, flow respectively through the slots *pb, pv, pr* of the anode G of the decoding tube C of Fig. 1.

On the screen *Fl* of tube O, the elemental area in question is constituted, as above stated, by the area common to three juxtaposed vertical bands (respectively blue, green and red) and one horizontal scanning line. Owing to the action of control electrode *g*, the instantaneous brightnesses of the three zones of this area corresponding to these three bands (i. e. of the blue, green and red zones of this elemental area) have values corresponding to the electronic fluxes passing respectively at the same times through slots *pb, pv, pr* of the anode G of the decording tube C. These brightnesses correspond therefore respectively to the proportions in which the three basic colors (blue, green and red) are to be mixed together to reproduce the color of the corresponding elemental area of the scene that is being televisioned, as transmitted by color signal T.

In the case of Fig. 3, the relaxation oscillation (the frequency of which is that of the picture scanning lines) is applied to a quadripole or four terminal system ST working as a generator of harmonics (coil with a saturated magnetic core or saturated diode). Filter *fm* (having a very narrow pass band) extracts from this complex mixture of harmonics a sinusoidal wave at the elemental area frequency, and this high frequency wave is applied to coils $b_1$ and $b_2$, in phase for the first one and in quadrature (through dephaser D) for the other one.

In the case of Fig. 4, in order to create the desired rotary field, I make use of the vertical wave front of the synchronizing pulse $\tau$, obtained at the output of demodulator DM*t* (Fig. 1), to synchronize a relaxation oscillation generator GR*m* at high frequency (frequency equal to the number of elemental picture areas scanned per unit of time). By means of a highly selective filter *fm*, I extract the fundamental component of this high frequency relaxation oscillation. This fundamental component (which is a sinusoidal wave) is applied to coils $b_1$ and $b_2$ as above.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In a color television system of the type in which a brightness signal and a coded color signal are transmitted to characterize every television picture elemental area that is being scanned, a receiver which comprises, in combination, a decoding device including a cathode ray tube having a linear cathode to emit an electron beam, means including a cathode control electrode and responsive to variations of said brightness signal for modulating the intensity of said electron beam, three anodes corresponding respectively to the three basic colors of the coded color signal, three output circuits connected to said anodes respectively, and means operative in response to variations of said coded color signal for distributing the electrons of said beam to said three anodes respectively in accordance with the value of said coded color signal, a viewing cathode ray tube having a three colored band network on its luminescent screen, the three colors of this network being said three basic colors respectively, the bands of said network being transverse to the direction of the scanning lines on said screen and the width of each band being equal to the width of the scanning spot of said viewing tube, an electronic gun in said viewing tube for forming said spot, means for controlling the intensity of said spot, and electronic switch means working at a frequency of recurrence equal to the number of television picture elemental areas scanned per unit of time for successively applying to said spot intensity control means, during the time said spot scans three juxtaposed bands of said network, the respective voltages in said three output circuits, respectively.

2. A receiver according to claim 1 including a generator of relaxation oscillations for controlling the scanning of said spot, said electronic switch means being operatively connected with said generator.

GEORGES VALENSI.

No references cited.